United States Patent [19]

Killpatrick et al.

[11] Patent Number: 5,438,410
[45] Date of Patent: Aug. 1, 1995

[54] RING LASER GYRO BIAS DRIFT IMPROVEMENT METHOD AND APPARATUS

[75] Inventors: Joseph E. Killpatrick, Minneapolis; Dale F. Berndt, Plymouth, both of Minn.

[73] Assignee: Honeywell Inc., Minneapolis, Minn.

[21] Appl. No.: 900,403

[22] Filed: Jun. 18, 1992

[51] Int. Cl.6 .............................................. G01B 9/02
[52] U.S. Cl. ................................................. 356/350
[58] Field of Search ...................................... 356/350

[56] References Cited

U.S. PATENT DOCUMENTS

| | | | |
|---|---|---|---|
| 3,581,227 | 5/1971 | Podgorski | 356/350 |
| 4,152,071 | 5/1979 | Podgorski | 356/350 |
| 4,267,478 | 5/1981 | Ljung et al. | 356/350 X |
| 4,320,974 | 3/1982 | Ljung | 356/350 |
| 4,383,763 | 5/1983 | Hutchings et al. | 356/350 |
| 4,597,667 | 7/1986 | Curby et al. | 356/350 |

Primary Examiner—Mark Hellner
Attorney, Agent, or Firm—Craig J. Lervick; Robert B. Leonard

[57] ABSTRACT

A ring laser gyro bias drift improvement method and apparatus for compensating for periodic bias drift including a microprocessor which controls a path length control circuit that continuously adjusts the position of path length control mirrors. The mirrors are stepped through a range of positions that represent two laser modes. The microprocessor adjusts the position of the two path length control mirrors such that total path length remains constant. The invention improves bias drift by forcing the laser gyro system to operate at varying path length control positions. Each position has a varying bias that was shown to be periodic over two laser modes. By operating the laser system over a range of two laser modes the periodic bias error of the laser gyro is cancelled out over time.

23 Claims, 5 Drawing Sheets

RING LASER GYRO BIAS DRIFT IMPROVEMENT METHOD AND APPARATUS

This invention relates to a method and apparatus for compensating for measured rotational rate drift and more particularly to a method and apparatus for improvement of compensation for bias drift in a ring laser gyro.

BACKGROUND OF THE INVENTION

Figure 1:
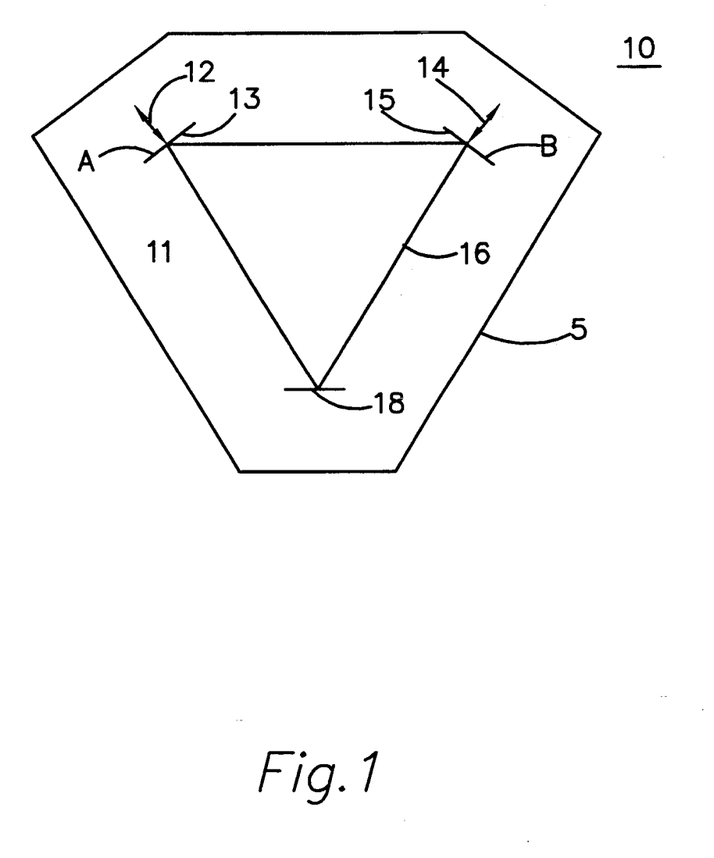
FIG. 1 shows a schematic block diagram of a ring laser gyro using the method and apparatus of the invention.

Ring laser angular rate sensors, sometimes referred to as ring laser gyros, are well known in the art. A detailed description may be found in the "Background of the Invention" of U.S. Pat. No. 4,597,667, which is incorporated herein by reference. FIG. 1 shows schematically a ring laser gyro system. Briefly, such sensors include a ring laser gyro 10 supported in a block 5 having a plurality of gas containing tunnels (not shown). At the intersection of the tunnels are mirrors 13, 15, and 18 that define a closed-loop optical path 16 which is traveled by counter-propagating laser beams therein. Practical embodiments of ring laser angular sensors usually include a path length control apparatus. The purpose of the path length control apparatus is to maintain a constant path length for the counter-propagating laser beams. Maintaining a constant path length avoids false rotation errors from the laser gyro. The path length control function is usually provided by an arrangement wherein at least one of the mirrors is attached to a piezoelectric transducer which controls translational movement of the mirror or mirrors. The transducer effects the laser beam path length in response to a drive signal provided through a transducer drive amplifier. In the example shown in FIG. 1 mirrors 13, 15 are path length control mirrors. Mirrors 13, 15 move along paths represented by arrows 12, 14 in response to path length control signals.

One technique for maintaining a constant path length is to detect the intensity of one or both of the laser beams and control the path length of the ring laser such that the intensity of one or both of the beams is at a maximum. U.S. Pat. No. 4,152,071 which issued May 1, 1979 to T.J. Podgorski, and is assigned to the assignee of the present invention illustrates a control mechanism and circuitry as just described. Path length transducers for controlling the path length of the ring laser are well known, and particularly described in U.S. Pat. No. 3,581,227, which issued May 25, 1971 to T.J. Podgorski, also assigned to the assignee of the present invention, U.S. Pat No. 4,383,763, which issued May 17, 1983 to Hutchings et al and U.S. Pat. No. 4,267,478, which issued May 12, 1981 to Bo H.G. Ljung, et al. All these patents are incorporated herein by reference.

In the aforementioned patents, the beam intensity is either detected directly as illustrated in the aforementioned patents, or may be derived from what is referred to as the double beam signal such as that illustrated in U.S. Pat No. 4,320,974, which issued on Mar. 23, 1982 to Bo H.G. Ljung, and is also incorporated herein by reference.

Herein "mode" is defined as the equivalent of one wavelength of the laser beam. For a helium-neon laser, one mode is equal to 0.6328 microns which is equal to 24.91 micro-inches.

In path length control systems of the prior art, the path length control finds mirror positioning for which the lasing polygon path length, i.e., the ring laser path length, is an integral number of wavelengths of the desired mode or frequency, as indicated by a spectral line, of the lasing gas. With proper design, the path length control forces the path length traversed by the laser beams to be a value which causes the laser beams to be at maximum power.

As is also known in the prior art, ring laser gyros are subject to small bias drift errors. Bias drift errors can result in significant inaccuracies if the ring laser gyros are operated for extremely long periods of time.

Figure 2:
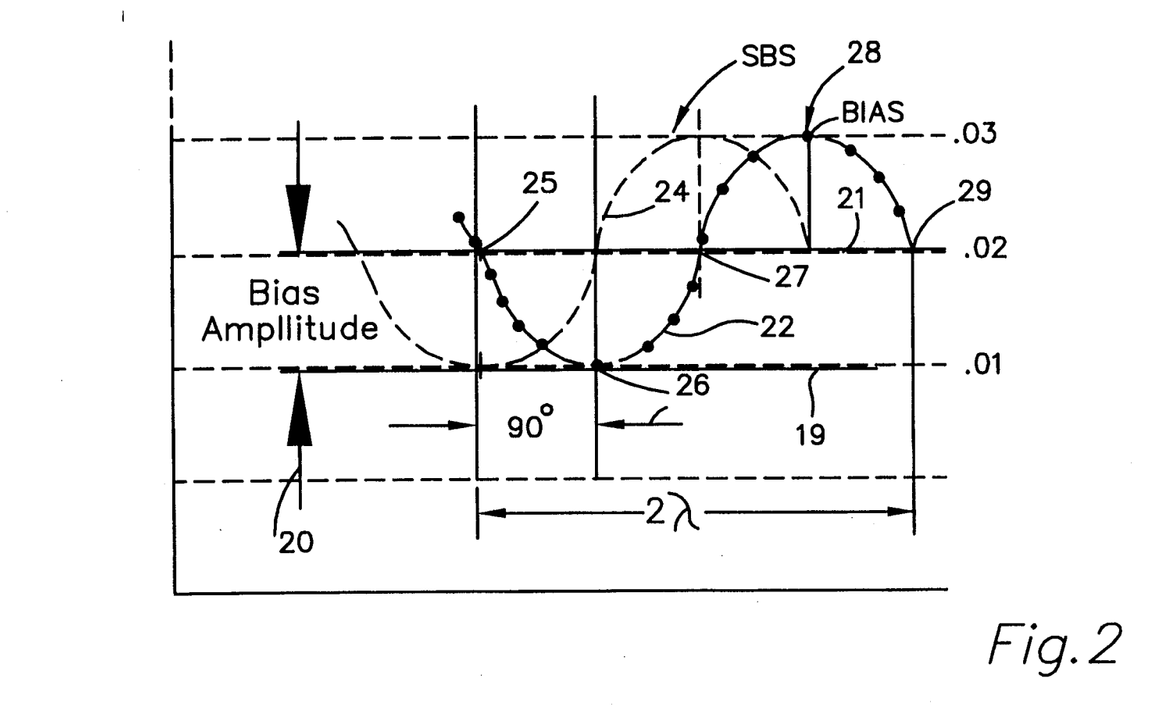
FIG. 2 shows a plot of a laser gyro bias curve with a plot of a laser gyro single beam signal.

Now referring to FIG. 2 which shows the results of new, unpublished experiments conducted by Honeywell Inc. of Minneapolis, Minn. which imply the existence of a ring laser gyro bias drift that is periodic. The typical bias magnitude change 22 was on the order of $(+/-)$ 0.01°/hr about a mean value shown as line 21 in FIG. 2. Bias magnitude changes, shown as curve 22, were observed to be sinusoidal in nature with respect to mirror position shown as the X axis 19 in FIG. 2. The plot in FIG. 2 shows the bias magnitude change curve 22 in relation to the single beam signal curve 24. The single beam signal curve 24 is derived from the magnitude of the AC component of the laser intensity monitor signal. Experimentally the bias was found to be 90° out of phase, as shown by magnitude 26, with the single beam signal curve 24 (SBS) but equal in period. Typically the average bias crossings 25 and 27 of the BIAS sinusoid curve 22 occur at the minimum or maximum of the SBS signal curve 24.

The bias curve 22 is shown varying sinusoidally during one period of movement of the two mirrors 13 and 15. One period of movement is equivalent to two wavelengths. Even though the mirrors are moving the system maintains a constant laser path 16 in the laser gyro 10 as shown in FIG. 1.

The plot of FIG. 2 implies that as one mirror is moved "out" one wavelength and the other mirror is moved "in" one wavelength, for a total of two wavelength changes, the bias in the laser gyro 10 varies over one complete period. Ideally the bias will vary uniformly as the mirrors are moved from an average bias point 25 to a negative maximum bias point 26 through an average bias again at point 27 to a maximum bias at point 28 to return to an average bias at point 29. Those skilled in the art having the benefit of this new disclosure will recognize that with respect to the average bias 21 the integral of the bias curve 22 over one period of the curve from point 25 to point 29 is zero which implies that the total bias over the entire period is the average bias 21.

The present method and apparatus of the invention exploits the above described phenomena to accomplish a bias drift improvement.

SUMMARY OF THE INVENTION

The invention provides a bias drift improvement for a laser gyro that exploits the inherent periodic nature of the bias drift of the laser in the laser gyro system. A microprocessor controls a path length control circuit that continuously adjusts the position of path length control mirrors. The mirrors are stepped through a range of positions that represent two laser modes. The microprocessor adjusts the position of the two path length control mirrors such that total path length remains constant. The invention improves bias drift by forcing the laser gyro system to operate at varying path length control positions. Each position has a varying bias that was shown to be periodic over two laser modes. By operating the laser system over a range of two laser modes the periodic bias error of the laser gyro is cancelled out over time.

It is one object of the invention to provide an improved bias drift compensation mechanism for a laser gyro.

It is another object of the invention to provide an improved bias drift compensation method and apparatus that exploits the sinusoidal and periodic nature of a laser gyro's bias drift.

It is yet another object of the invention to provide an improved bias drift compensation method and apparatus that moves gyro path length control mirrors in steps over two laser modes to compensate for laser gyro drift.

It is another object of the invention to provide an improved bias drift compensation method and apparatus that utilizes a microprocessor based path length control.

Other objects, features and advantages of the present invention will become apparent to those skilled in the art through the Description of the Preferred Embodiment, Claims, and drawings herein wherein like numerals refer to like elements.

BRIEF DESCRIPTION OF THE DRAWINGS

To illustrate this invention, a preferred embodiment will be described herein with reference to the accompanying drawings. The preferred embodiment concerns a laser gyro bias drift and random drift improvement method and apparatus.

FIG. 3 shows one embodiment of the invention used to implement the bias drift improvement method of the invention showing a microprocessor controlling a path length control circuit with pulse width modulation.

DESCRIPTION OF THE PREFERRED EMBODIMENT

Now referring to FIG. 3 which shows the apparatus of the invention used to control the path length transducers of the invention. The apparatus of the invention controls the path length transducers for mirror A and mirror B of the laser block 200. The laser block has a number of sensors including a temperature sensor 33 which sends a temperature signal which is amplified by temperature sensor amplifier 58 which provides a temperature signal 31 to the on board A/D converter 110.

The laser block 200 also has a power detect signal 57 which is picked up from photo diode 56 connected to DC amplifier 68 which provides the laser intensity monitor (LIM) signal 20. The gyro block 200 transducer mirrors A and B 13, 15 provide the principle means by which path length control is achieved. As the laser path is adjusted with the path length control transducers the laser intensity monitor signal 20 will vary. The invention provides a number of components that help process the laser intensity monitor signal into a useful set of signals including the laser intensity monitor signal 20, a path length control monitor signal 32 and a single beam signal 36.

The AC amplifier 50 sees the AC component of the laser intensity monitor 20. The output of the AC amplifier 50 is sent to a synchronous demodulator 52 which provides a signal to an integrator 54 which generates the path length control monitor signal PLCMON 32. The output of the AC amplifier 50 is also AC coupled to a peak detector 66 which provides a single beam signal 36. The AC amplifier 50 also has as an input from the sweep signal 112 which is synchronized to the switch signal 116. The synchronous demodulator 52 also provides a method by which the closed loop path from the laser intensity monitor through to the path length control monitor can be used to adjust the path length.

The high level circuit diagram of FIG. 3 illustrates the method of the invention to control path length. The synchronous demodulator provides a way of controlling the path length mirrors in a fashion such that the path length control transducers are continuously looking for the peak of a laser mode.

Figure 4:
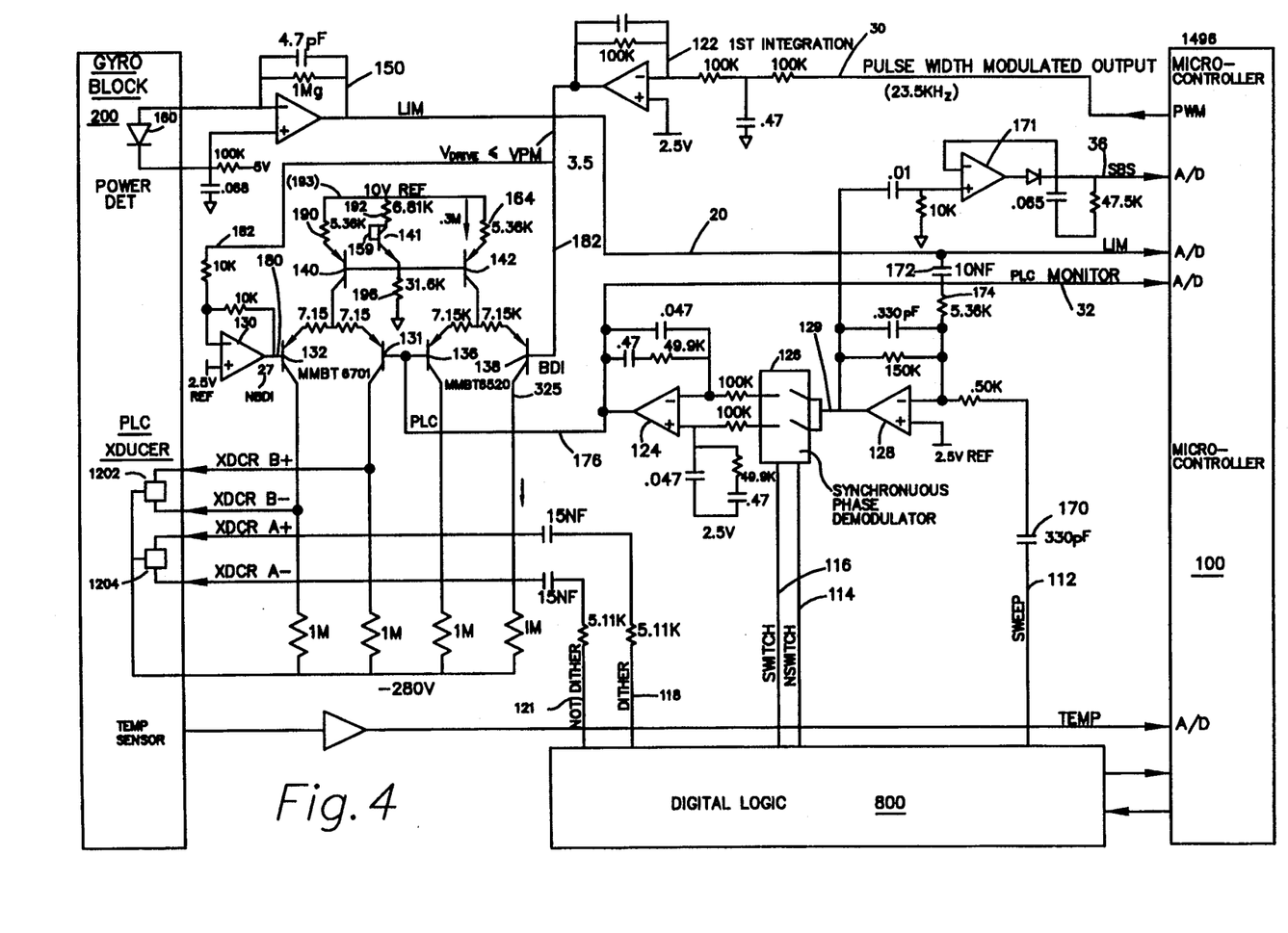
FIG. 4 shows one embodiment of the invention used to implement the bias drift improvement method of the invention showing a microprocessor controlling a path length control circuit with pulse width modulation.

Shown in FIG. 4 is one embodiment of a path length controller as employed in one example of the invention used to step through a number of modes of the laser. The path length controller of FIG. 4 comprises digital logic 800, the sweep signal 112, a not switch signal 114, the switch signal 116, a first dither signal 118, a second dither signal 121, a first integrator 122, a second integrator 124, a synchronous phase demodulator switch 126, an amplifier 128 and inverter 130. Also included are a first set of driving transistors 136, 138 and a second set of driving transistors 131, 132.

The sweep line 112 supplies a 3 Khz signal during start up of the laser gyro. The sweep line 112 carries a signal designated SWEEP. The two switching lines 114, 116 also supply 3 Khz signals to the switch 126 wherein the first switching line 114 is 180° out of phase with the second switching line 116. The switching lines in one example are designated SWITCH (SW) and NOTSWITCH (NSW) respectively. Similarly, the dither lines 118, 121 are designated DITHER (D) and NOTDITHER (ND) respectively. They also supply a 3 Khz signal from the digital logic 800 wherein the 3 Khz signals are 180° out of phase with each other. The dither lines and the switching lines are offset by 90 degrees in phase.

In operation the digital logic turns on the sweep line 112 in response to a start up command from the controller 100 on control line 111. At the same time the digital logic turns off the DITHER 118 and NOTDITHER 121 lines during the time the SWEEP signal is applied. When the gyro has swept to the desired laser mode, the SWEEP signal is removed and the DITHER and NOTDITHER lines 118, 121 are enabled. The sweep line 3 Khz signal is also related to the SWITCH and NOTSWITCH signals 116, 114. The sweep line 3 Khz signal will be in phase with one of the switch signals depending upon the mode to be swept, up or down. The 3 Khz SWEEP signal is connected through an AC coupling capacitor 170 to the inverting input of the first amplifier 128. The signal is then routed through switch 126 to the inverting or non-inverting input of the second integrator 124. In operation, if the SWEEP signal is in phase with the switch signal 116, the output of the amplifier 128 will be routed through the non-inverting input of integrator 124. If the SWEEP signal is in phase with the NSW or NOTSWITCH signal line 114 the SWEEP signal will be routed through the inverting input of the second integrator 124. Those skilled in the art, having the benefit of this disclosure, will recognize that these relationships may be manipulated in various combinations to produce substantially similar results. The SWEEP signal is left on for a long enough period of time such that the output of the integrator at node 176 will achieve a high enough voltage for the modular gyro to sweep to a predetermined mode. Node 176, designated as a PLC Monitor signal, is monitored by the microprocessor controller 100 at A/D input 32.

Control line 111 provides control signals to the digital logic device 800 to substantially switch the operational mode of the path length controller from sweep to running mode. The computer algorithm used for acquiring a desired mode is explained further in detail below.

Also supplied to the controller 100 is the laser intensity monitor signal ("LIM") at A/D input 20. The laser intensity monitor signal is picked up from photo-detector 160 in the gyro block 200. The signal is amplified by transimpedance amplifier 150 and sent to the controller. The LIM signal 20 is AC coupled by capacitor 172 and fed back to the first amplifier 128 through the inverting input. Note that the RC circuit comprising capacitor 172 and resistor 174 are constructed as a high pass filter to allow the 3 Khz dithering signal to pass to the non-inverting input of amplifier 128. Therefore, in the sweep mode, which is usually on during start-up of the laser gyro, when the DITHER and NOTDITHER lines 118 and 121 are turned off, any LIM signal components are blocked by capacitor 172 from appearing on the non-inverting input of amplifier 128.

The controller 100 continuously outputs a pulse width modulation signal PWM0 30 into the first integrator 122. This PWM0 signal is converted by integrator 122 into a path length control signal which is applied to the transistor drivers 132 and 138 in opposite polarities. The first component of the drive signal is applied to transistor 138. The second component 182 of the drive signal is applied through inverter 130 to transistor 132 to drive a second transducer in the gyro block. The PLC signal from the second integration amplifier 124 drives transistors 138 and 136 and the PLC signal together with the path length control signals operating in pairs to differentially drive two sets A and B of transducers in the gyro which are connected to two mirrors 13 and 15 in the gyro block shown in FIG. 1. In FIG. 4, the transducer drivers are shown as elements 1202 and 1204 by their representative capacitances. In practice, as is well known, these are typically piezoelectric elements. Piezoelectric transducers elements 1202 and 1204 have center taps that are connected to the most negative voltage −280 volts. In this way the piezoelectric elements never see a reverse voltage polarity and this consequently reduces hysteresis effects.

In one embodiment of the invention a constant current source comprising transistors 140 and 142 together with resistive components 190, 192,194 and 196 are arranged to provide a current of about 0.3 ma into each leg of the transducer differential driving transistor pairs 131, 132 and 136, 138. The synchronous phase demodulator continues to seek the peak LIM signal based on the phase of the amplified LIM signal 129.

Figure 5:
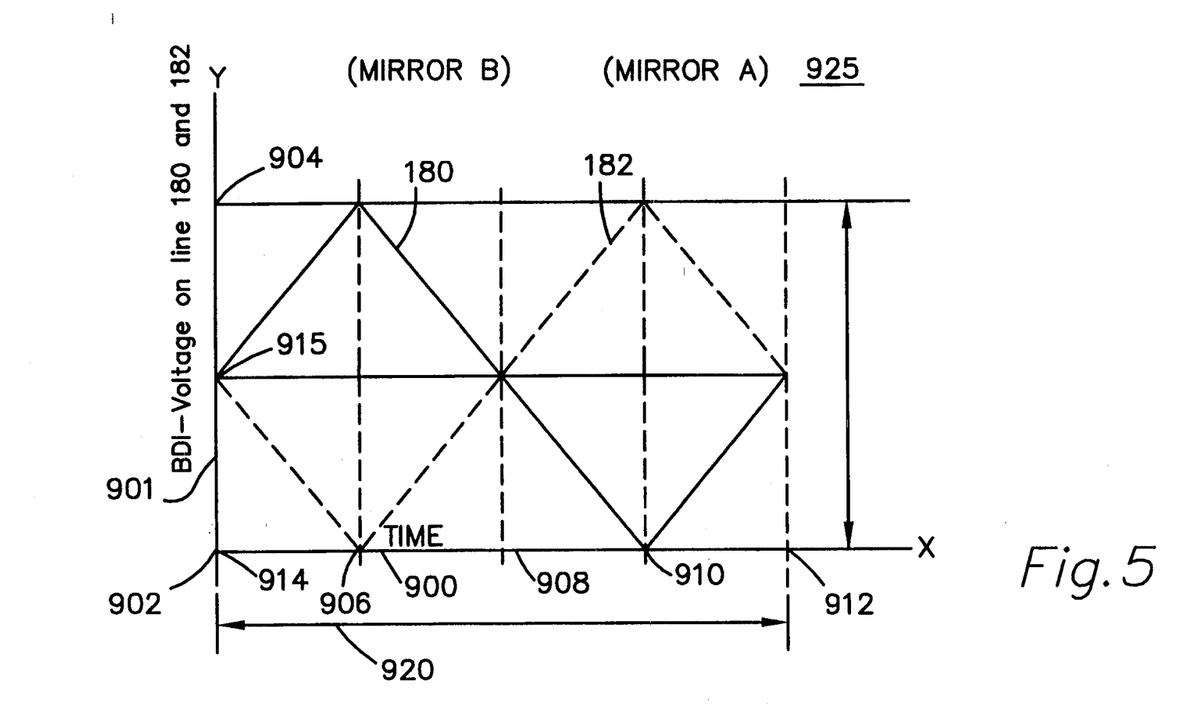
FIG. 5 shows a plot of a laser gyro bias improvement control voltage against time.
Figure 6:
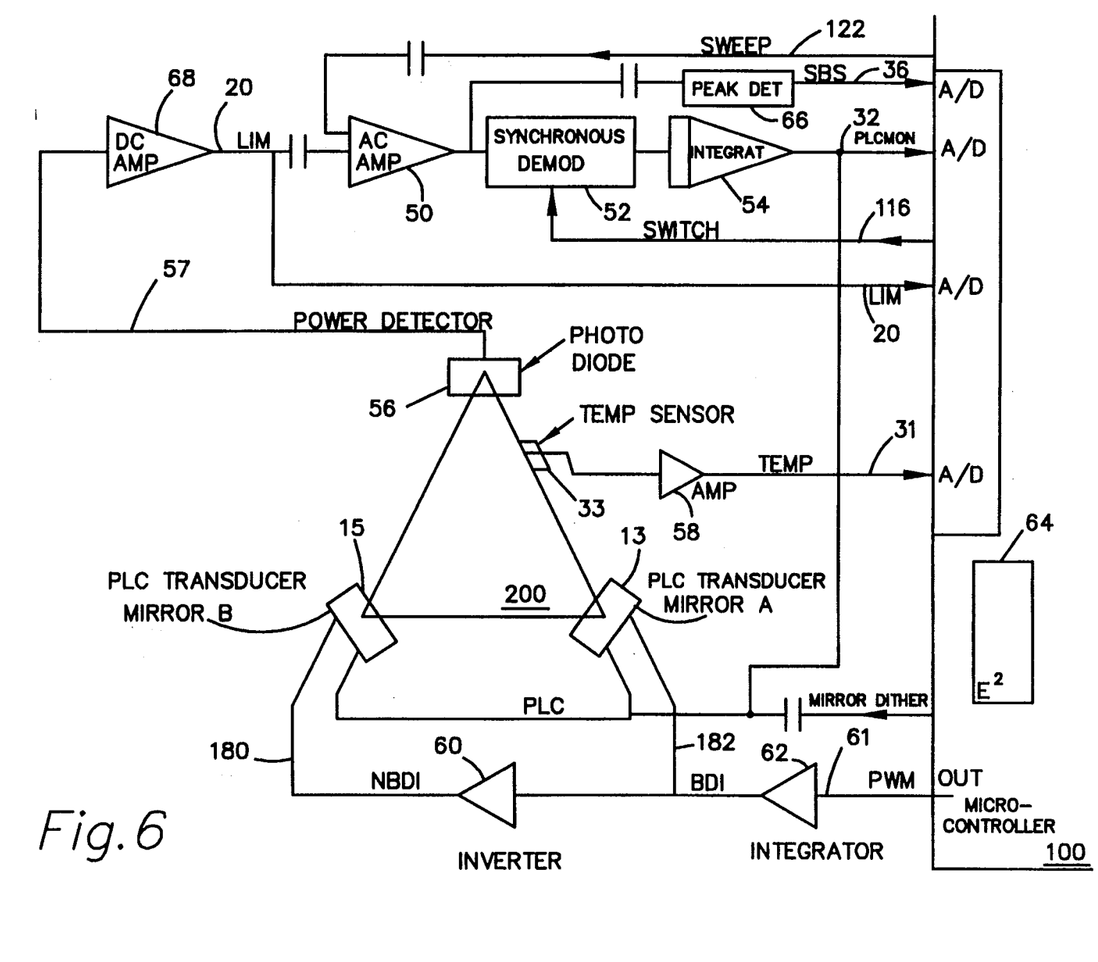

Now referring to FIG. 5 which shows a plot of the BDI control voltage against time. In the bias drift improvement method and apparatus of the invention the laser gyro system is operated through a two wavelength range. The laser gyro path length control mirrors 13 and 15 are stepped through a 2 wavelength change. In one preferred embodiment of the invention the path length control mirrors are moved in a differential fashion, that is they are moved in opposite directions.

FIG. 5 shows the use of mirror A 13 which has been moved to cause the path length of the laser beam to move increasingly through two wavelengths of the laser. FIG. 5 also shows the use of mirror B 15 which has been moved to cause the path length of the laser beam to move decreasingly through two wavelengths of the laser. The x axis 900 shows time. The y axis 901 shows BDI control voltage. At all points in time the method of counter movement of the mirrors results in no net change in path length. Once the mirrors have traversed through their range of motion they reverse and move opposite their original direction. This motion is repeated continuously during the bias drift error compensation mode of the invention.

The entire BDI cycle 925 is run over a time period 920 no longer than the stability of the bias drift. In one preferred embodiment of the invention the time period 920 is 10 minutes. The BDI voltage 180 driving mirror B 15 is run from an average value 915 at time 914 to a high positive value 904 at time 906 back to the average value at time 908 to a high negative value 902 at time 910 back to the average value at time 912. The BDI voltage 182 driving mirror A is run from an average value 915 at time 914 to a high negative value 902 at time 906 back to the average value 915 at time 908 to a high positive value 904 at time 910 back to the average value at point 912. Driving the BDI control voltages 180 and 182 in this fashion moves the path length control mirrors through the BDI cycle without changing the path length and while also not effecting the ability of the laser gyro to provide an accurate gyro response.

This invention has been described herein in considerable detail in order to comply with the Patent Statutes and to provide those skilled in the art with the information needed to apply the novel principles and to construct and use such specialized components as are required. However, it is understood that the invention can be carried out by specifically different equipment and devices, and that various modifications, both by equipment details and operating procedures, can be accomplished without departing from the scope of the invention itself.

What is claimed is:

1. A bias drift rate improvement apparatus for a laser gyro having a laser with a path length, a first path length control mirror with a first mirror position, a second path length control mirror with a second mirror position, and a bias drift rate that varies periodically with the first mirror position and the second mirror position, wherein the bias drift rate improvement apparatus comprises:

(a) a first mirror positioning means coupled to the first path length control mirror for positioning the first path length control mirror;
   (b) a second mirror positioning means coupled to the second path length control mirror for positioning the second path length control mirror; and
   (c) a control means for controlling the first mirror positioning means and the second mirror positioning means the control means being coupled to the first and second mirror positioning means such that the second and first mirror positions change over one period of the bias drift rate.

2. The bias drift rate improvement apparatus of claim 1 wherein the control means further includes means for moving the first and second path length control mirrors such that the path length is held substantially constant.

3. The bias drift rate improvement apparatus of claim 1 wherein the control means further includes means for moving the first and second path length control mirrors such that the first path length control mirror and the second path length control mirror move continuously and periodically.

4. The bias drift rate improvement apparatus of claim 2 wherein the means for controlling further includes a continuous movement means coupled to the first path length control mirror and the second path length control mirror, wherein the continuous movement means operates so as to move the first and second path length control mirrors continuously and periodically.

5. The bias drift rate improvement apparatus of claim 1 wherein the control means includes a means for moving the first path length control mirror and the second path length control mirror such that they move uniformly, continuously and periodically.

6. The bias drift rate improvement apparatus of claim 2 wherein the control means includes a means for moving the first path length control mirror and the second path length control mirror such that they move uniformly, continuously and periodically.

7. The bias drift rate improvement apparatus of claim 1 wherein the control means includes a means for moving the first path length control mirror and the second path length control mirror wherein the means for moving operates to uniformly, continuously and periodically move the first and second path length control mirrors such that the first path length control mirror is in each first mirror position an equal amount of time and the second mirror is in each second mirror position an equal amount of time.

8. The bias drift rate improvement apparatus of claim 2 wherein the control means further includes a continuous moving means coupled to the first path length control mirror and the second path length control mirror so as to move the first and second path length control mirrors uniformly, continuously and periodically such that the first path length control mirror is in each first mirror position an equal amount of time and the second path length control mirror is in each second mirror position an equal amount of time.

9. The bias drift rate improvement apparatus of claim 1 wherein the laser gyro further includes a means for detecting a SBS random drift rate while noting the position of the first and second path length control mirrors as they move.

10. The apparatus of claim 9 wherein the means for detecting a random drift rate comprises a single beam signal detector.

11. The apparatus of claim 10 wherein the single beam signal detector comprises a peak to peak detector.

12. The apparatus of claim 9 wherein the laser gyro has a minimum random drift rate and the laser gyro includes a path length control means coupled to the first and second path length control mirrors, wherein the path length control means operates so as to maintain the first and second path length control mirrors in a position corresponding to the minimum random drift rate.

13. The bias drift rate improvement apparatus of claim 2 wherein the laser gyro further includes a means for detecting a random drift rate while noting the position of the first and second path length control mirrors as they move.

14. The bias drift rate improvement apparatus of claim 13 wherein the means for detecting a random drift rate comprises a single beam signal detector.

15. The bias drift rate improvement apparatus of claim 14 wherein the single beam signal detector comprises a peak to peak detector.

16. The bias drift rate improvement apparatus of claim 13 wherein the laser gyro has a minimum random drift rate and the laser gyro includes a path length control means coupled to the first and second path length control mirrors, wherein the path length control means operates so as to maintain the first and second path length control mirrors in a position corresponding to the minimum random drift rate.

17. A laser gyro having a laser with a path length and a wavelength and an intensity, a first path length control mirror and a second path length control mirror, the laser gyro comprising:
(a) digital logic means for providing a plurality of modulation signals including a SWEEP signal, a SWITCH signal, a NOTSWITCH signal, a DITHER signal, and a NOTDITHER signal;
(b) a first inverter means coupled to the digital logic means at a first input and including an output;
(c) a means for switching coupled at a signal input to the output of the first inverter means, coupled at a first control input to the SWITCH signal and coupled at a second control input to the NOTSWITCH signal, wherein the switching means has a first output corresponding to a first switch position and a second output corresponding to a second switch position;
(d) a means for integrating coupled at a first input to the first of the switching means output, coupled at a second input to the second of the switching means output, and including an output providing a path length control signal;
(e) means for monitoring laser beam intensity and providing a laser beam intensity monitor ("LIM") signal;
(f) means for controlling the digital logic means, including means for providing a pulse width modulated signal, a first analog-to-digital input, and a second analog-to-digital input, wherein the controlling means is coupled at a logic control output to a control input of the digital logic means, wherein the controlling means is coupled at the first analog-to-digital input to the path length control signal, wherein the controlling means is coupled at the second analog-to-digital input to the LIM signal, wherein the controlling means provides control signals to the digital logic means to operate the plurality of modulating signals in response to the path length control signal, wherein the controlling means further determines a pulse width modulation duty cycle range for a pulse width modulation signal in response to the path length control signal and the LIM signal; and
(g) means, coupled to the to the means for providing a pulse width modulated signal and coupled to the path length control signal, for differentially driving the first path length control mirror and the second path length control mirror in response to the pulse width modulation signal.

18. The laser gyro of claim 17 wherein the digital logic means operates in a first mode to sweep a lasing mode by turning on the SWEEP signal and suppressing the DITHER signal and NOTDITHER signal.

19. The laser gyro of claim 17 wherein the laser gyro further comprises:
  (a) a first mirror positioning means for positioning the first path length control mirror;
  (b) a second mirror positioning means for positioning the second path length control mirror; and
  (c) wherein the means for controlling controls the first mirror positioning means and the second mirror positioning means such that the first control means causes the first mirror to move through a distance, equal to the distance the first mirror would have to travel to change the path length at least one wavelength, by a first plurality of steps over a first predetermined time period and the second control means causes the second mirror to move through a distance, equal to the distance the second mirror would have to travel to change the path length at least one wavelength, by a second plurality of steps over a second predetermined time period.

20. The apparatus of claim 19 wherein the control means moves the first mirror and the second mirror to substantially keep the path length constant.

21. The apparatus of claim 19 wherein each of the first plurality of steps is equal in time and distance and wherein each of the second plurality of steps is equal in time and distance.

22. A method of improving total laser gyro drift rate using a laser gyro bias drift rate improvement method and laser gyro random drift rate improvement method, wherein the laser gyro includes a plurality of path length control mirrors, wherein the method of improving total laser gyro drift rate comprises the steps of:
  (a) performing for a first predetermined time a bias drift improvement method and noting an operating position of the path length control mirrors at the minimum random drift rate;
  (b) operating the laser gyro with the path length control mirrors at the operating position for a second predetermined amount of time; and
  (c) returning to step (a) to dynamically compensate the laser gyro.

23. The method of claim 22 wherein the laser gyro further comprises a single beam signal with a minimum intensity and the minimum random drift rate corresponds to the mirror position having the minimum single beam signal intensity.

* * * * *